US006665677B1

(12) United States Patent
Wotring et al.

(10) Patent No.: US 6,665,677 B1
(45) Date of Patent: Dec. 16, 2003

(54) SYSTEM AND METHOD FOR TRANSFORMING A RELATIONAL DATABASE TO A HIERARCHICAL DATABASE

(75) Inventors: Steve C. Wotring, Austin, TX (US); John R. Ripley, Round Rock, TX (US)

(73) Assignee: Infoglide Corporation, Austin, TX (US)

(*) Notice: Subject to any disclaimer, the term of this patent is extended or adjusted under 35 U.S.C. 154(b) by 79 days.

(21) Appl. No.: 09/677,477

(22) Filed: Oct. 2, 2000

Related U.S. Application Data

(60) Provisional application No. 60/157,477, filed on Oct. 1, 1999.

(51) Int. Cl.⁷ .............................................. G06F 17/30
(52) U.S. Cl. ....................................................... 707/100
(58) Field of Search ........................ 707/1–10, 100–200

(56) References Cited

U.S. PATENT DOCUMENTS 5,455,945 A * 10/1995 VanderDrift ................... 707/2
5,467,471 A * 11/1995 Bader ........................... 707/1
5,604,892 A * 2/1997 Nuttall et al. ................ 703/18
5,708,828 A * 1/1998 Coleman ..................... 707/523

OTHER PUBLICATIONS

Jennifer Widom, Department of Computer Science, Stanford University, "Research Problems in Data Warehousing", 6/95, ACM, PP 25–30.*

* cited by examiner

*Primary Examiner*—Greta Robinson
*Assistant Examiner*—S R Pannala
(74) *Attorney, Agent, or Firm*—Taylor Russell & Russell, P.C.

(57) ABSTRACT

The present invention comprises a computer-implemented method for transforming data in a relational database to a hierarchical database. It comprises creating an import map that maps each relational database field to a hierarchical field in the hierarchical database using a relational database schema and a hierarchical database schema, using the import map to import data from the relational database; and transforming the relational data into hierarchical documents. The method further comprises creating a hierarchical database schema that corresponds to the relational database schema. The hierarchical documents may be stored in computer memory or on disk.

9 Claims, 18 Drawing Sheets

```
                                          ─709
┌─────────────────────────────────────────────┐
│    HIERARCHICAL SCHEMA STRUCTURE            │
│  EXAMPLE FOR A KNOWN OFFENDERS              │
│            DATABASE                         │
├─────────────────────────────────────────────┤
│                                             │
│    −KNOWN OFFENDERS                         │
│        PRIMARY KEY                          │
│    −PERSON                                  │
│        −NAME                                │
│            HONORARIUM                       │
│            FIRST                            │
│            MIDDLE                           │
│            LAST                             │
│            SUFFIX                           │
│        −ADDRESS                             │
│            STREET                           │
│            CITY                             │
│            STATE                            │
│            ZIP                              │
│        −DESCRIPTION                         │
│            HEIGHT                           │
│            HAIR COLOR                       │
│            EYE COLOR                        │
│                                             │
└─────────────────────────────────────────────┘
```

FIG-7A

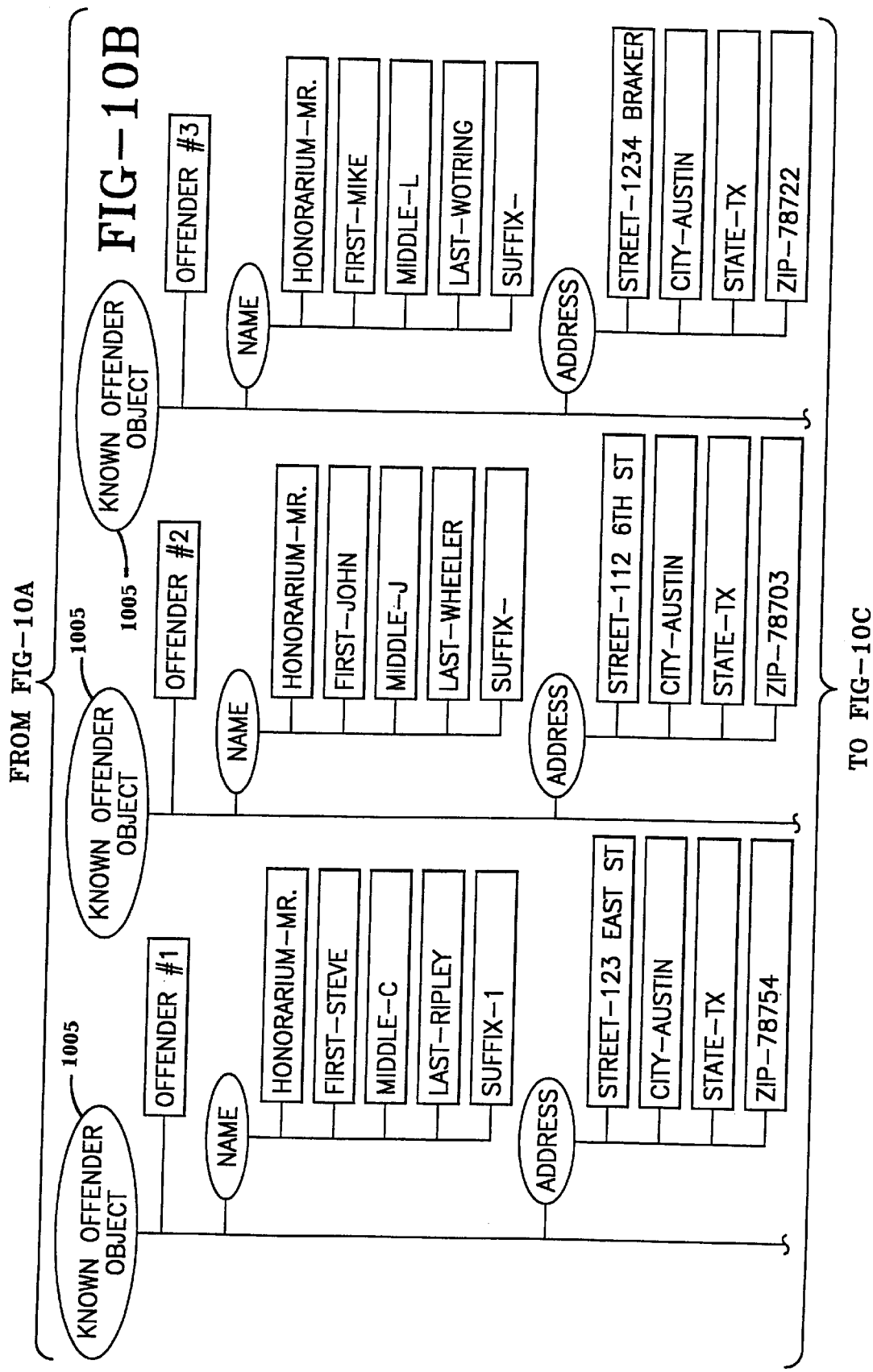

SYSTEM AND METHOD FOR TRANSFORMING A RELATIONAL DATABASE TO A HIERARCHICAL DATABASE

CROSS REFERENCE TO RELATED APPLICATIONS

This application claims the benefit of U.S. Provisional Application No. 60/157,477, filed on Oct. 1, 1999.

TECHNICAL FIELD OF THE INVENTION

This invention relates to the field of transforming data from one format to another. In particular, the invention is directed to automated systems and methods for transforming a relational database into a hierarchical database whereby information in relational database tables is transformed into hierarchical objects.

BACKGROUND OF THE INVENTION

A relational database management system (RDBMS) is used to store information in the form of tables and fields. A hierarchical database management system (HDBMS) is used to store information in the form of related data objects. Both relational and hierarchical databases contain a structure according to which data is organized, known as a schema. The differences between the schemas of the separate database management systems can present difficulties when moving data between databases of different types, particularly when moving data between relational and hierarchical databases.

Part of the problem with moving data between one system and another is the way in which they store data and maintain relationships between data. In a Relational Database, data is stored in a series of tables. Each table represents a logical grouping of information. Individual tables usually do not contain sub-groupings, so the tables may be linked together, if at all, by primary keys. A primary key can be used to link relational data that is stored in separate tables within the database but is somehow related. The primary key may be stored in each separate related table. In a Hierarchical Database, information is stored in data objects that may contain one or more sub-element objects of particular kinds of data. Thus, a method for moving data between differing database systems is needed, which has the capacity to "transform" the actual data from one format to another.

SUMMARY OF THE INVENTION

The present invention solves the aforementioned problem and allows data to be transformed from a relational database to a hierarchical database. The invention creates via a map structure a union between the structure of the relational database and the hierarchical database. The present invention allows data transformation objects to be created that relate to the tables in a relational database and to the schema of the corresponding hierarchical database. The present invention allows for the manipulation of particular data values in the transformation process to improve data integrity and quality using data scrubbing algorithms that may be specified by the user or program defaults. Due to the need to move data from one database type to another, a method has been invented for successfully extracting information from a RDBMS to a HDBMS, based on the schema information from both databases. In particular, the method can transform relational database data from many database tables into a single hierarchical data object, as needed.

The present invention comprises a computer-implemented method for transforming data in a relational database to a hierarchical database. It comprises creating an import map that maps each relational database field to a hierarchical field in the hierarchical database using a relational database schema and a hierarchical database schema, using the import map to import data from the relational database; and transforming the relational data into hierarchical documents. The method further comprises creating a hierarchical database schema that corresponds to the relational database schema. The hierarchical documents may be stored in computer memory or on disk.

Creating a hierarchical document schema comprises the following steps: step 1: determining a relationship between a first table in the relational database and a second table in the relational database using a primary key; step 2: forming a compound object in a hierarchical document that is associated with the first table; step 3: forming an object selected from the group consisting of a compound object and a simple object that is associated with the second table; and step 4: repeating steps 1 through 3 until all tables within the relational database are associated with an object in the hierarchical document.

The method of creating the import map and transforming the relational data comprises creating a hierarchical database schema, comprising at least one compound and at least one simple object. For each compound object, an SQL statement is defined, which expresses a 1 to n relationship of the compound object to its parent object and which expresses source fields available for child objects of the compound object. Each simple object is related to at least one source field name in its parent compound object. The source field names are extracted from the relational database for all compound objects using the SQL statement. The simple object accesses the source field names of its parent compound object to determine the source field names the simple object can map to. The import map is traversed and each time an SQL statement is encountered, the SQL statement is executed which results in a dataset. Each dataset is traversed and the relational data for each simple object based on the dataset is found. The creating a hierarchical database schema comprising at least one compound and at least one simple object is based on a relational database key structure where the relational database key structure has at least one primary key and at least one foreign key. A data scrubbing algorithm may be applied to the relational data and storing the scrubbed data in the hierarchical document.

The present invention comprises computer-readable media having computer-executable instructions for performing the methods as above.

The present invention comprises computer-readable media in the form of a data structure containing a collection of hierarchical objects in an import map. The import map comprises at least one compound object. The compound object comprises an indicator of a relational database and a field name of relational data associated with the compound object, a structured query language (SQL) statement, and a source field name extracted from the relational database using the SQL statement. The simple object comprises a field name of relational data associated with the simple object and the relational data extracted from the relational database and stored in the simple object.

BRIEF DESCRIPTION OF THE DRAWINGS

FIG. 7A displays the hierarchical schema structure for one embodiment of an exemplary database, a known offenders database.

FIGS. 10A, 10B and 10C are examples of the creation of a hierarchical database using an exemplary relational database.

DETAILED DESCRIPTION

Figure 1:
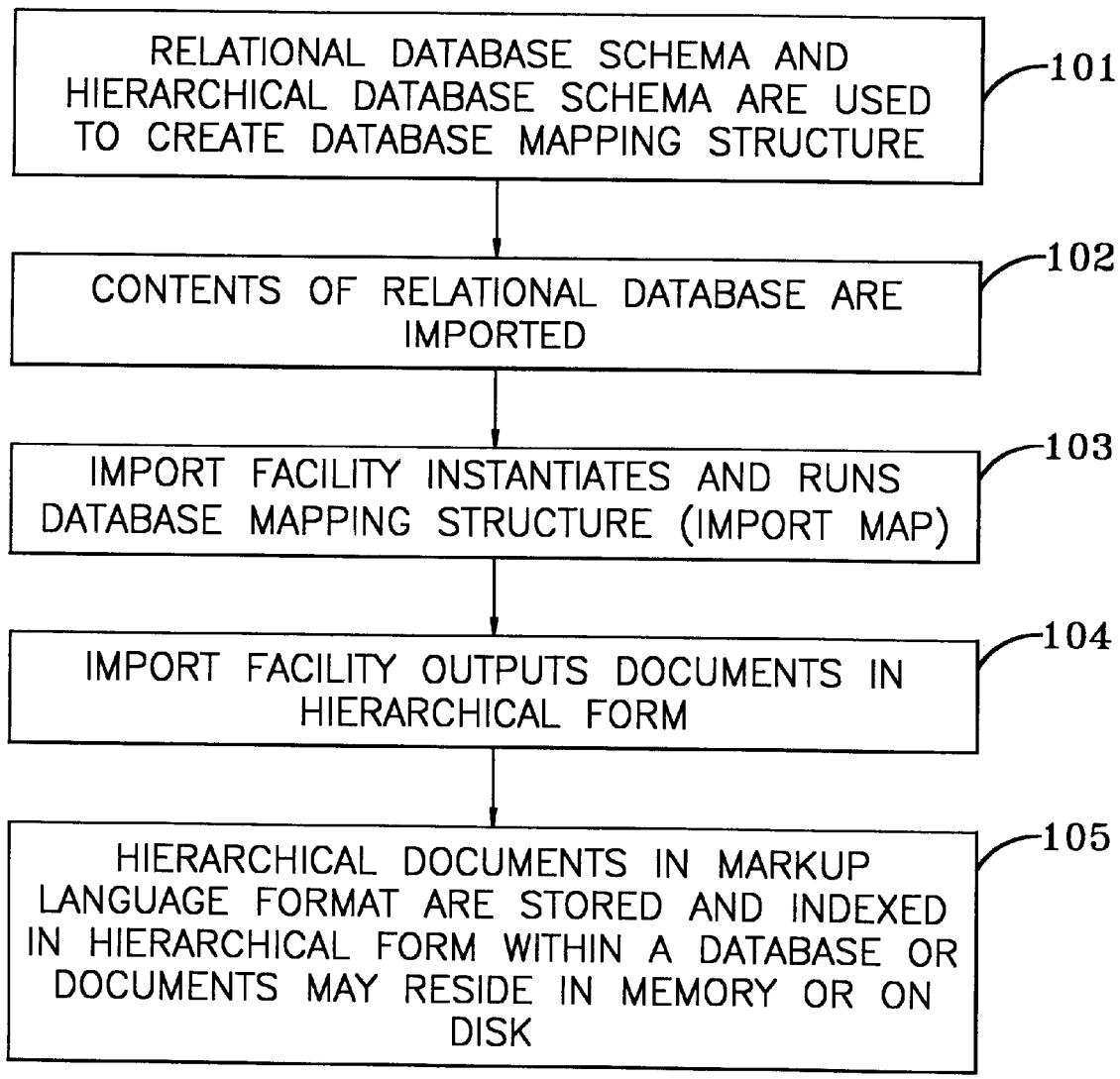
FIG. 1 is a flowchart that illustrates a method for transforming a relational database to a hierarchical database.

Referring now to FIG. 1, the invention is directed to a method for transforming a relational database to a hierarchical database. A relational database management system (RDBMS) is a collection of data items organized as a set of formally-described tables from which data can be accessed or reassembled in many different ways without having to reorganize the database tables. Data in relational databases is stored in a collection of tables, which represent both data and relationships among the data. Each entry in a table may be known as a record. A hierarchical database management system (HDBMS) organizes data in a hierarchical object structure, which is often a tree-type structure. An HDBMS may be (but need not be) an object-oriented database management system (OODBMS or ODBMS), which is a database management system that supports the modeling and creation of data as objects. This includes some kind of support for class of objects and the inheritance of class properties and method by subclasses and their objects. In accordance with step 101, a relational database schema and a hierarchical database schema are used to create a database mapping structure. The database mapping structure takes the form of an import map that defines the logic for transforming relational database records into hierarchical database objects. In accordance with step 102, the content of an existing relational database is imported to an import facility function. This importation is achieved via a Structured Query Language (SQL) statement sent by the import facility, to which the relational database responds by transmitting its content. SQL is a standard programming language used to get information from and to update a relational database. SQL statements (also called queries) take the form of a command language that allows users to access, define, and manipulate data contained in a database, particularly a relational database.

In accordance with step 103, the import map of the database mapping structure is then instantiated and run by the import facility, effecting the transformation of relational database logical records into hierarchical database objects. In accordance with step 104, the import facility generates output from the transformation process. The output comprises at least one hierarchical document that is sent to a hierarchical database for storage and indexing, in accordance with step 105. The hierarchical documents may be stored in any type of software markup language, for example XML, SGML or HTML.

Figure 2:
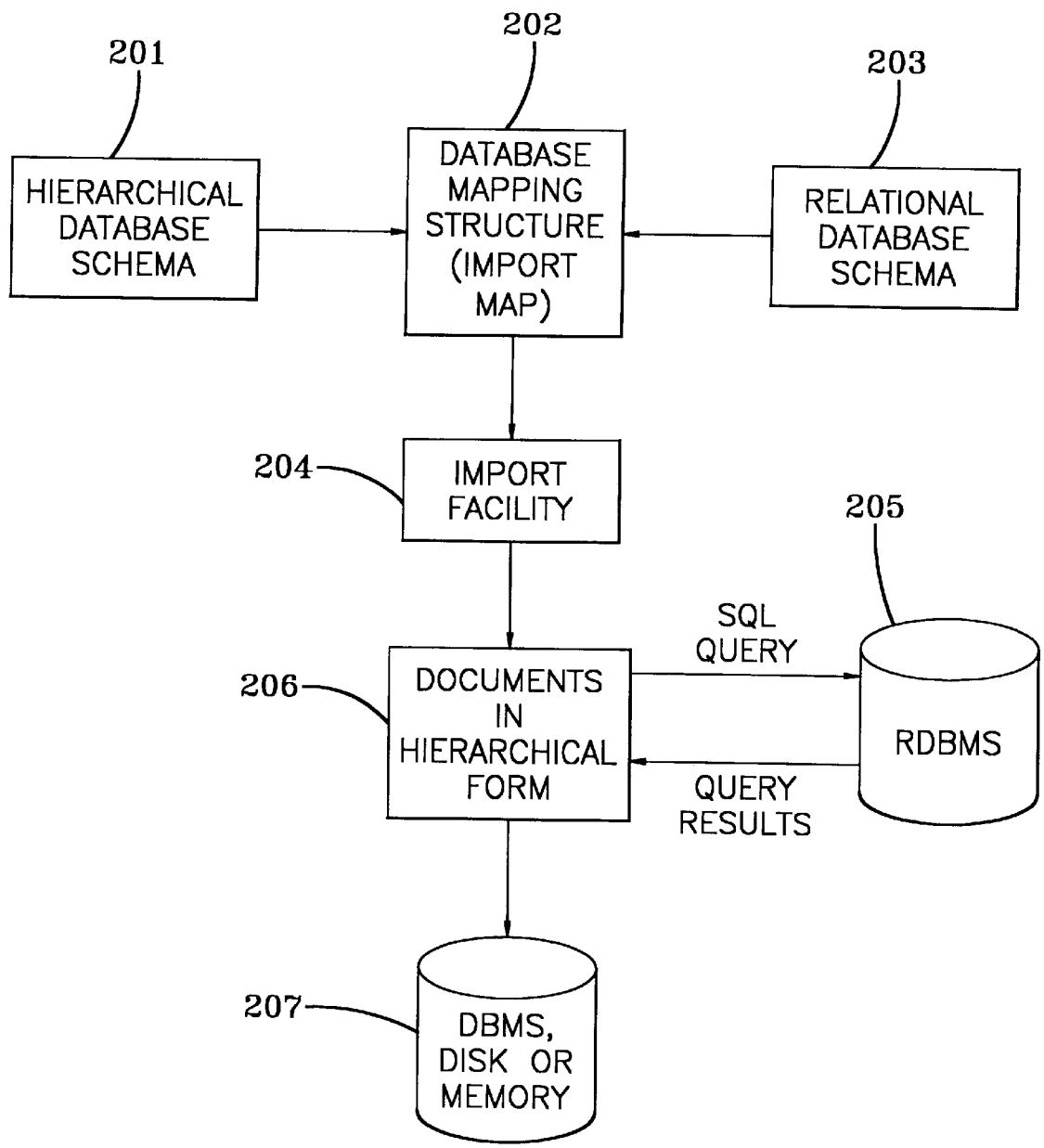
FIG. 2 is a pictorial diagram that further illustrates the method displayed in FIG. 1.

Referring now to FIG. 2, Relational Database Schema 203 and Hierarchical Database Schema 201 are used to create a Database Mapping Structure 202. Database Mapping Structure 202, also called Import Map, defines the logic for transforming the records of an existing relational database into hierarchical database objects. The content of Relational Database 205 is imported to Import Facility 204, via Structured Query Language (SQL) statements sent by Import Facility 204.

Import Map 202, is then instantiated and run by the Import Facility 204. Import Facility 204 generates output from the transformation process. The output comprises at least one Hierarchical Document 206 that is sent to Hierarchical Database 207 for storage and indexing.

Figure 3:
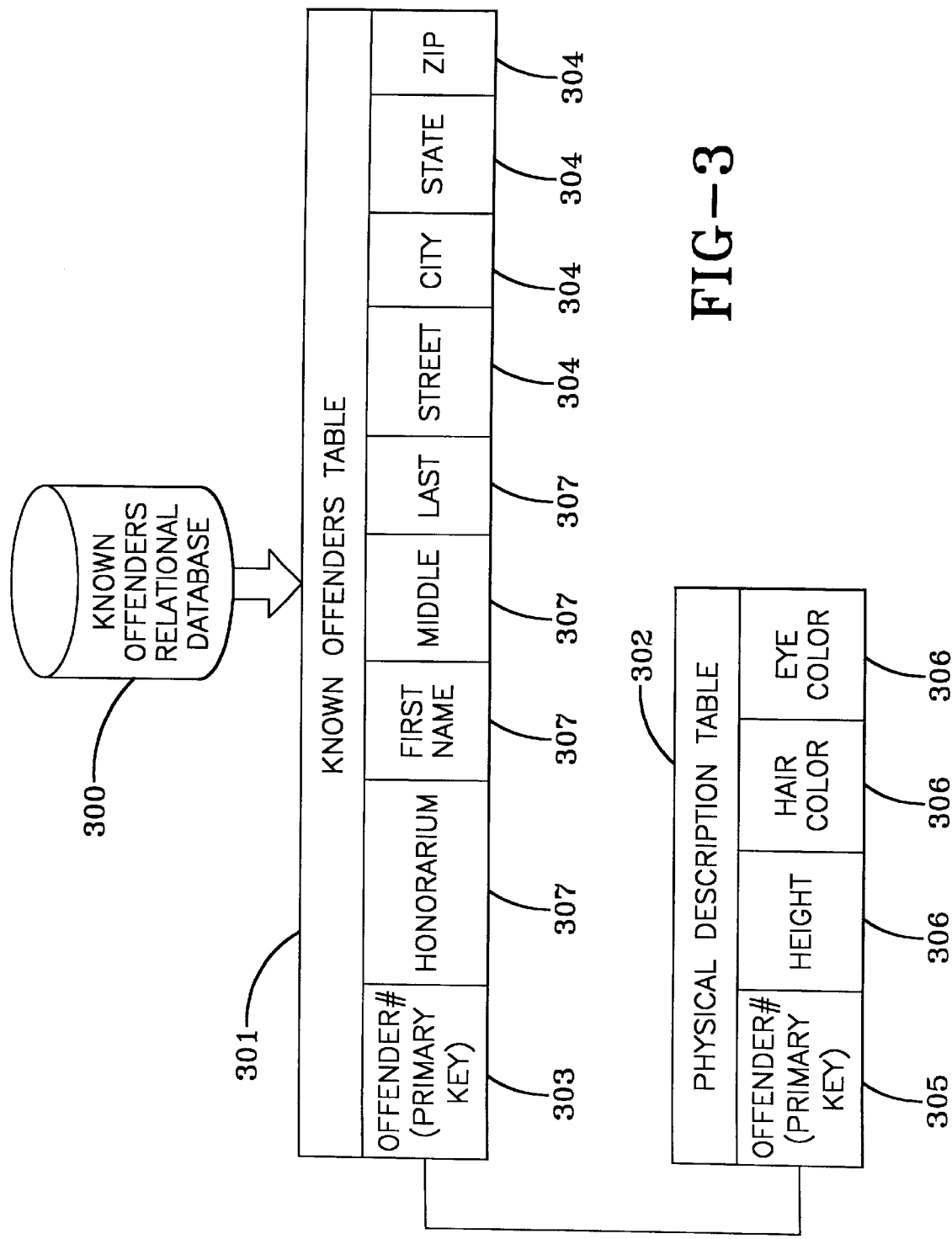
FIG. 3 illustrates a relational database schema, in accordance with an example application of the current invention.

FIG. 3 illustrates an exemplary relational database schema, in reference to an embodiment of the current invention. A schema is a description for how data is stored in a database. The schema defines the logical categories in which data can be stored, as well as the attributes that belong to the individual logical categories. In a relational database, groups of individual fields are stored in logical groupings called tables. A relational database typically contains parent tables that hold the main information the database is trying to capture and a series of child tables that hold information associated with the parent tables. Each table contains fields that hold the individual data values that are stored by the relational database.

Associations between parent and child tables are revealed through matching their key values. The key structure defines relationships between tables through any number of key fields that are shared between two or more tables. Hence, the term "relational database." The key structure is extremely important in identifying what the structure of the relational database is, in order to create a hierarchical schema. In addition, the key structure reveals how to tailor SQL statements during the database mapping process.

FIG. 3 displays how a relational database might be logically structured in a database of known criminal offenders. The diagram illustrates a Known Offenders Relational Database 300 that has two relational database tables, 301 and 302. Each table has identical primary key values, 303 and 305 respectively. The primary key identifies and allows the database tables to be associated with each other. The primary key value is "Offender #", a data value that maintains a relationship among the tables' data for each offender.

Tables 301 and 302 also have various fields, 304, 306 and 307, that are used to store particular data about each Offender. For example, the Known Offenders Table 301 stores data in various identification and location fields, such as name 307 and Address 304. Though also part of the Known Offenders Relational Database 300, the Physical Description Table 302 is a separate table from the Known Offenders Table 301. It stores information in description fields 306, such as hair and eye color or height. Though the tables 301 and 302 are separate, they are linked by their primary key values 303 and 305, which store an identifying number for the particular offender. In this way, identifying information can be linked to physical description information, without all information being stored in a single table.

Figure 4:
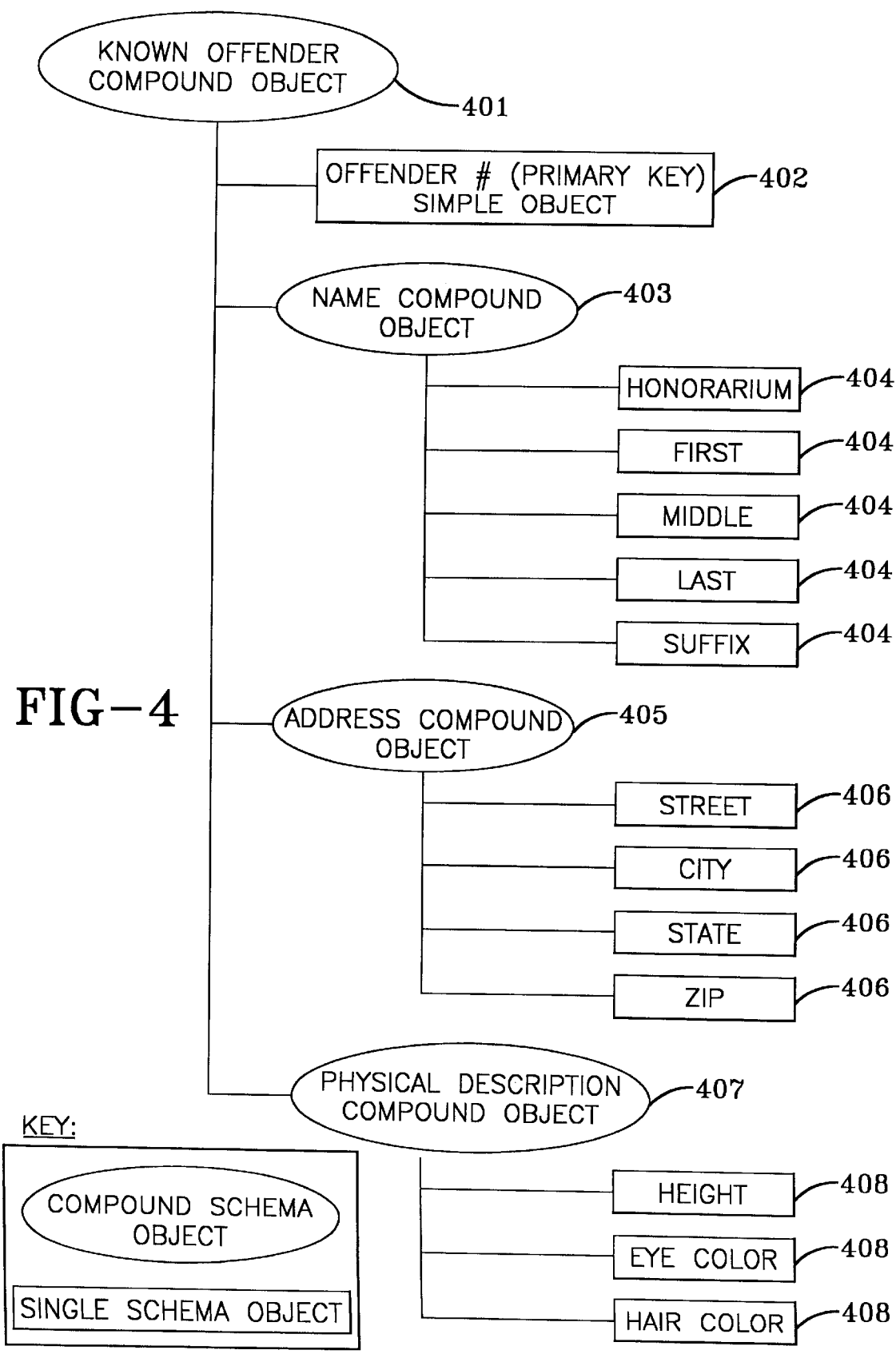
FIG. 4 illustrates a hierarchical database schema, in accordance with an example application of the current invention.

FIG. 4 illustrates a hierarchical database schema, in reference to an example application of the current invention. The figure displays how a hierarchical database might be logically structured in a criminal database management system. The hierarchical database may be an object-oriented database, but it does not have to be. The structure of a hierarchical database schema for a Known Offenders Database is shown. The hierarchical database schema contains compound schema objects 401, 403, 405, and 407. A compound schema object is a logical grouping of other hierarchical schema objects, whether simple or compound. The Hierarchical Database Schema also contains simple schema objects 402, 404, 406, and 408. A simple object is a logical record that contains no sub-groupings, that is, contains no children.

Simple and compound schema objects contained within an encompassing compound object are child objects in relation to the encompassing compound object. Likewise, the compound object that encompasses the child objects is the parent object in relation to the child objects. For instance, the simple schema objects 404, including 'Honorarium', 'First Name', 'Middle Name', and 'Last Name', are children of the Name Compound Object 403. The Offender Number Simple Object 402, the Name Compound Object 403 and its children 404, the Address Compound Object 405 and its children 406, and the Physical Description Compound Object 407 and its children 408, are all children of the Known Offenders Compound Object 401. Thus, the relation of parent objects to child objects creates the hierarchical structure or schema of the hierarchical database.

The transformation processes of the current invention, including the mapping and import processes, and the database mapping structure will now be described in further detail.

The first step in the transformation of a relational database to a hierarchical database is to create a hierarchical database schema that correlates with the structure of the existing relational database. In a relational database, there is usually a main or parent table that holds the basic information of the database and then a series of related tables that hold information associated with the main or parent table. Within a relational database, there is usually a relationship key structure between tables. The relationship key structure defines relationships between tables through one or more key files that are shared between tables. The key structure helps to identify the structure of the relational database and is used to create a hierarchical schema. The key structure also helps to allow tailoring of SQL statements during the database mapping process. For each relationship between the parent and its related table(s) in the hierarchical database, there will exist a hierarchical object that captures the total structure of the relationship key hierarchy.

Figure 5:
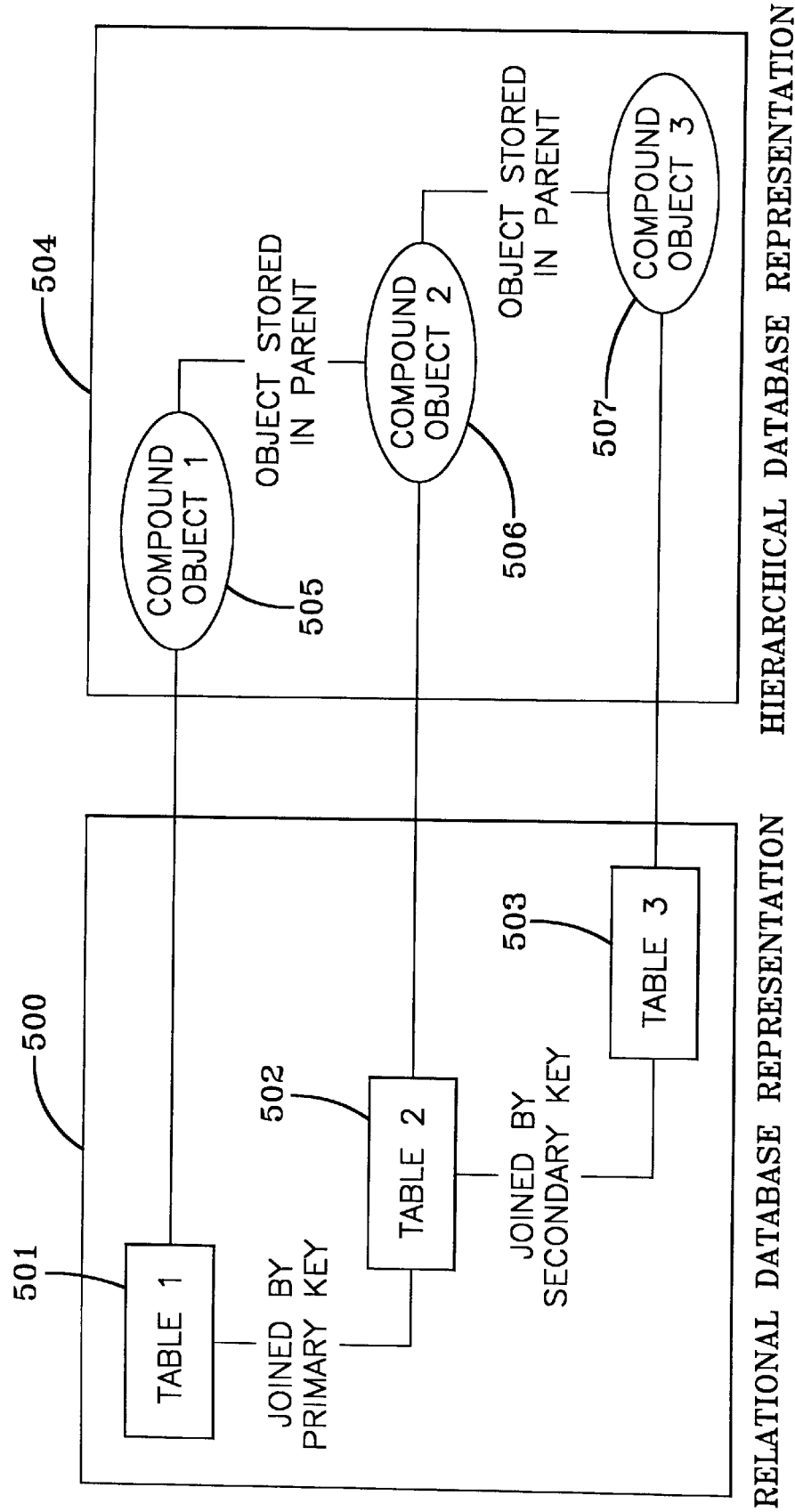
FIG. 5 is a diagram illustrating an overview of the method for transforming logical records of a relational database to database objects of a hierarchical database.

Referring to FIG. 5, the correlation between logical groupings in a relational database schema and a hierarchical database schema is shown. FIG. 5 shows Relational Database 500, which is organized via TABLE 1 501, TABLE 2 502, and TABLE 3 503. TABLE 1 501 and TABLE 2 502 are related via a primary key. TABLE 2 502 and TABLE 3 503 are related by a secondary key, also known as a foreign key. Thus, the tables are all related to each other, whether directly or transitively, thereby maintaining organization among the data that resides in the separate tables of the Relational Database 500.

FIG. 5 also shows a Hierarchical Database 504, which is organized via Compound Object 1 505, Compound Object 2 506, and Compound Object 3 507. Compound Object 2 506 is stored in Compound Object 1 505, thus making Compound Object 1 505 the parent of Compound Object 2 506. Likewise, Compound Object 3 507 may be stored in Compound Object 2 506, making Compound Object 2 506 the parent of Compound Object 3 507.

As shown in FIG. 5, the transformation of a Relational Database 500 to a Hierarchical Database 504 results in the data from each table of the Relational Database 500 being stored in a compound object of the Hierarchical Database 504. The determination of which table's data is stored in which compound object is for the user to determine, based upon the relationships between the tables in the Relational Database 500. In the embodiment shown, TABLE 1 501 is joined only to related TABLE 2 502 by a primary key. Thus, upon transformation, the data in TABLE 1 501 is stored in the parent Compound Object 1 505 which has no parent of its own. TABLE 2 502 is joined both to TABLE 1 501 by a primary key and to TABLE 3 503, by a secondary key, also known as a foreign key. Thus, upon transformation, the data stored in TABLE 2 502 is stored in Compound Object 2 506, which has a parent and a child of its own. TABLE 3 503 is joined to TABLE 2 502 by a secondary key and transitively joined to TABLE 1 501 via TABLE 2 502. Thus, upon transformation, the data stored in TABLE 3 503 is stored in Compound Object 3 507, which is a child of Compound Object 2 506.

It will be understood by those skilled in the art that a relational database having greater or fewer than three related tables may be transformed into a hierarchical database having a corresponding number of compound objects. It will also be understood that a single parent compound object may have multiple child compound objects. In FIG. 5, for instance, Compound Object 2 506 and Compound Object 3 507 may be related as siblings, both being children solely of Compound Object 1 505.

Figure 6:
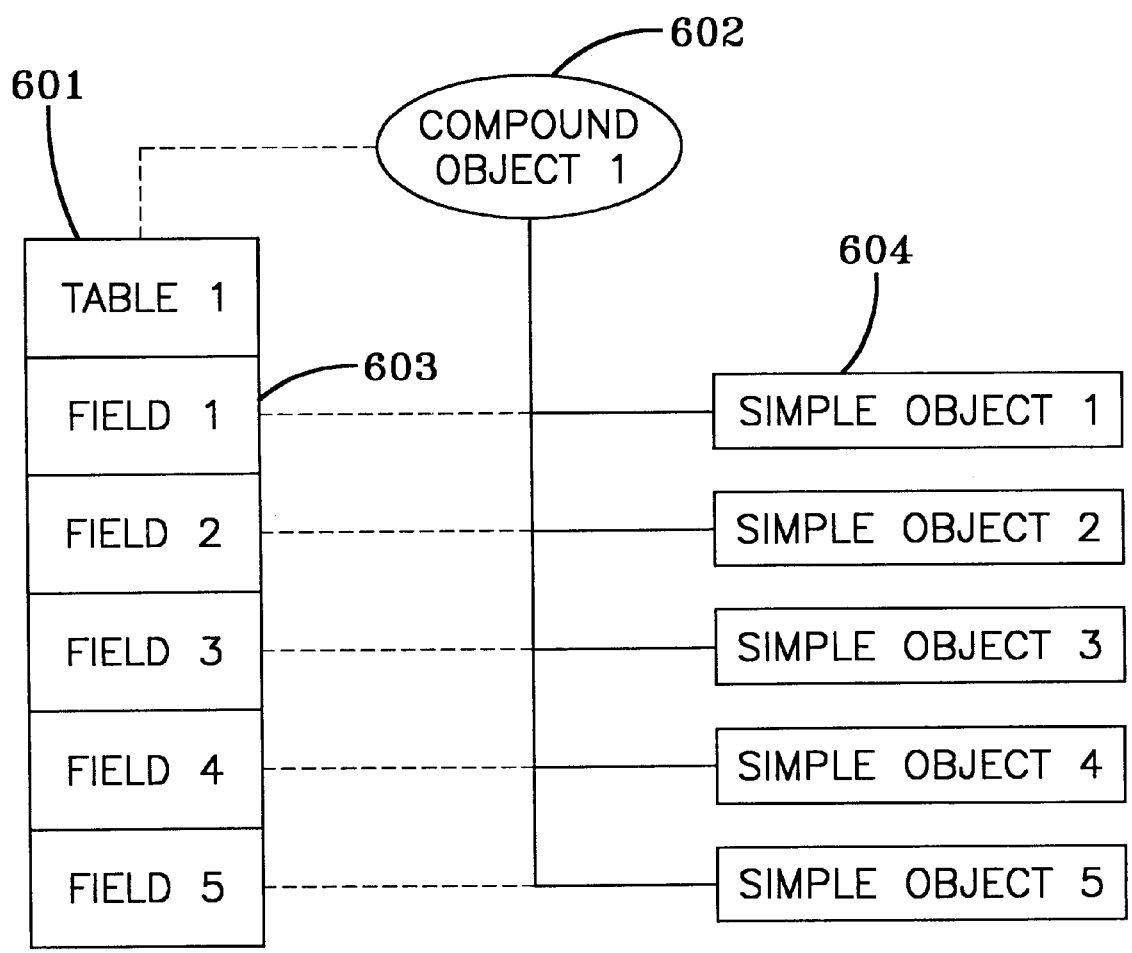
FIG. 6 is a diagram illustrating the method for transforming logical records of a relational database to database objects of a hierarchical database in further detail.

FIG. 6 shows a detailed diagram of how data in an individual relational database table is stored, upon transformation, in a compound object of a hierarchical database. Relational Database TABLE 1 601 has at least one field, a field representing the smallest individual part of the relational database. Compound Object 602 has at least one simple object, the simple objects representing the smallest individual part of the hierarchical database.

Upon transformation, the relational database is normalized, that is, reduced to its smallest associated categories of data—its fields. The logical grouping of data represented by TABLE 1 601 is transformed to Compound Object 1 602. Each field of TABLE 1 601, such as Field 1 603, is transformed to a simple object of Compound Object 1 602, such as Simple Object 1 604. In this way, both the logical groupings and smallest elements of data from the relational database will maintain their logical relationships amidst the different structure of the hierarchical database schema. There is no need to preserve the key structure from the existing relational database because the relationships are inherently preserved within the object hierarchy.

The second step in the transformation process of the current invention, after a hierarchical database schema has been created to accommodate the existing relational database, is to create a corresponding relational to hierarchical database mapping structure (import map)-.

Figure 7B:
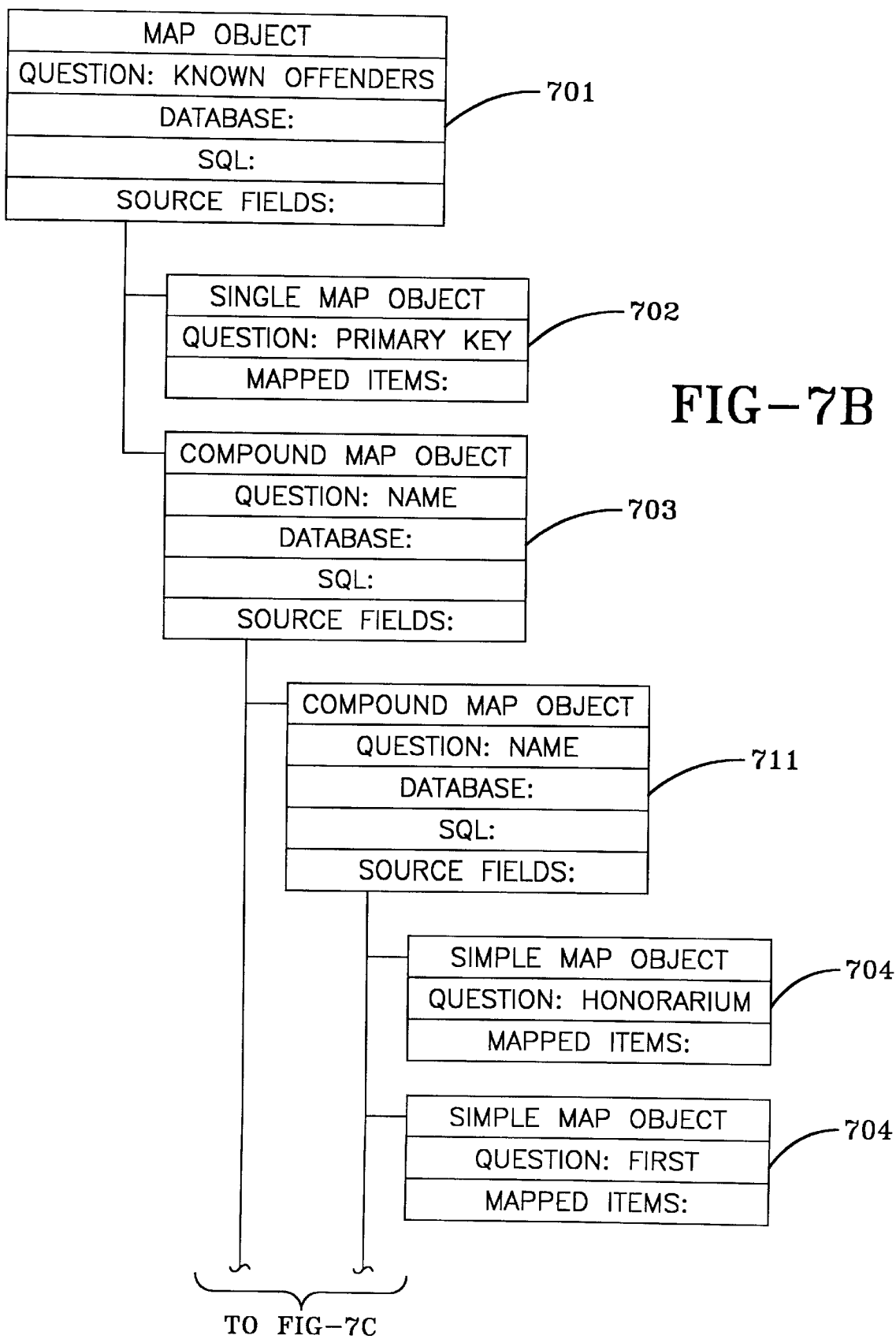
FIGS. 7B, 7C and 7D illustrate the database mapping structure of the current invention, in relation to a hierarchical database schema.
Figure 7C:
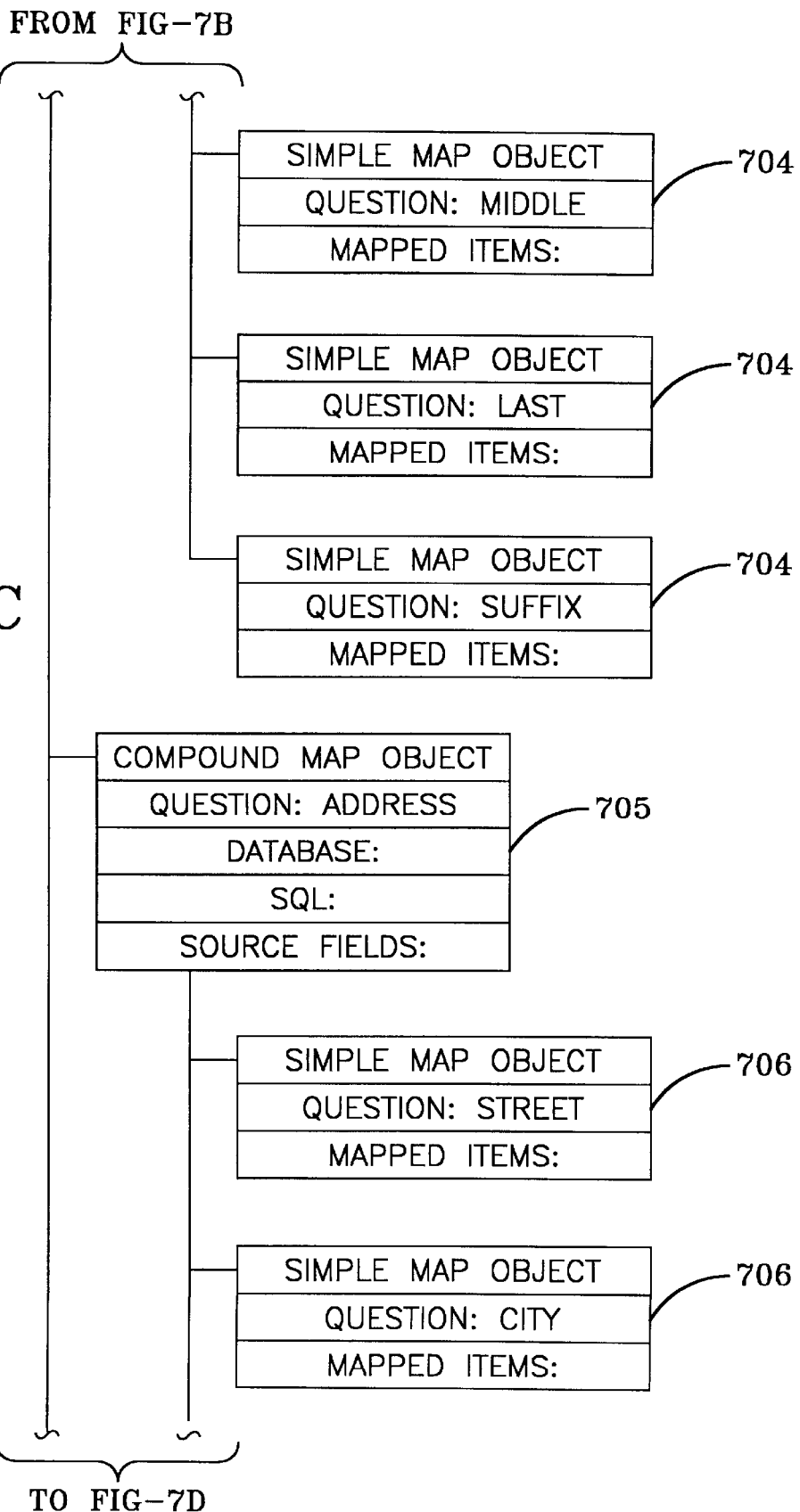
Figure 7D:
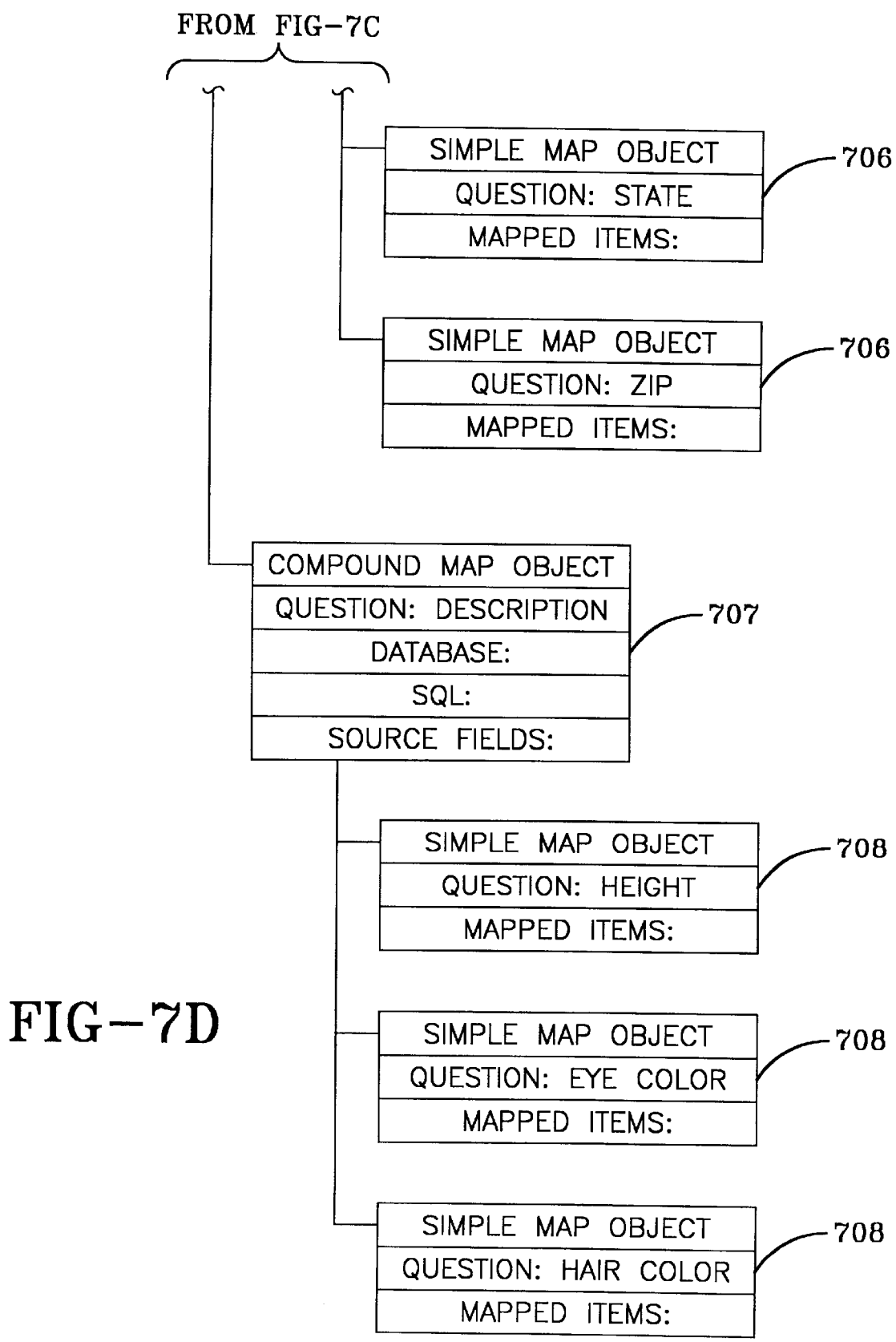

FIG. 7A displays the hierarchical schema structure for one embodiment of an exemplary database, a known offenders database. FIGS. 7B, 7C and 7D display the map file structure for a relational to hierarchical database map file in accordance with one application of the current invention. FIGS. 7A, 7B, 7C and 7D illustrate how the map file structure relates to a hierarchical database schema. The hierarchical database schema is created based on the fields and key structure of the relational database. After the hierarchical database schema is created, the relational to hierarchical mapping structure is created which is explained in more detail in FIGS. 8A and 8B. The mapping structure has a tree-type structure that correlates with the hierarchical database schema.

For every compound object in the hierarchical database schema 709, a compound map object is created, such as those represented by Compound Map Objects 701, 703, 705, 707 and 711. Each compound object includes a Question, which is the logical grouping represented by the object or its field or element name. A Question may be thought of as analogous to an element of an XML document. In a non-XML hierarchical document, the Question indicates an element's structural position in the hierarchy of the document. For example, compound object 701 includes the question "Known Offenders." The data stored in its child objects, whether simple or compound, will fall under this logical grouping. Similarly, compound object 711 includes the question "Name." The data stored in its child objects, whether simple or compound, will fall under the logical grouping of names of known offenders.

Each compound object also includes a Relational Database Name, which identifies the relational database from which data is to be drawn. Each compound object may also include an SQL statement that will be used to extract, from the named relational database, the specific logical grouping, or table, that will be stored in the compound object. Each compound object also includes Source Fields that identify the fields of the named relational database, from which data or logical sub-groupings will be retrieved and stored in the child objects of the compound object.

For every non-compound schema object in the hierarchical database, a simple map object is created, such as those represented by Simple Map Objects 702, 704, 706, and 708. Each simple map object includes a Question, which is the logical grouping represented by the object. A Question may be thought of as analogous to an element of an XML document. In a non-XML hierarchical document, the Question indicates an element's structural position in the hierarchy of the document. For simple map objects, this essentially comprises a name for the datum or data held in the simple object. For example, simple map object 704 includes the question "Middle Name." The specific data held by the object is the actual middle name of at least one known offender. Similarly, simple object 706 includes the question "Street." The specific data held by this simple object is the actual street in the address of at least one known offender. Each simple map object also includes Mapped Items that comprise the actual data transferred to the simple object from a field or fields of the relational database.

After a mapping structure is created that corresponds to the hierarchical schema, the mapping structure is essentially empty except for the Question of each object. The third step in the transformation process of the current invention, then, is the map specification process, which completes the map file from which the relational database data will be transformed and transferred to a hierarchical database.

Figure 8A:
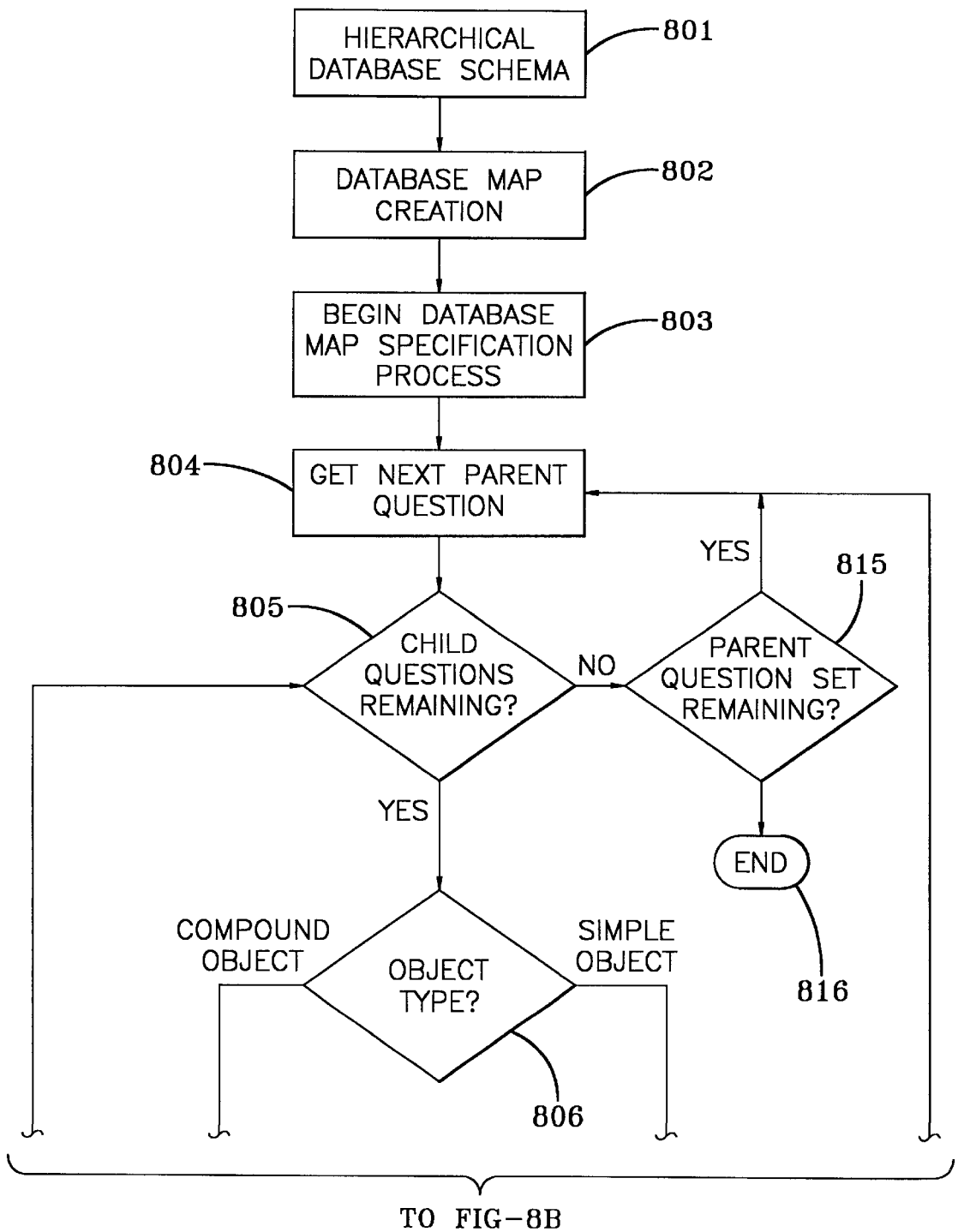
FIGS. 8A and 8B are flowcharts illustrating the database mapping process.
Figure 8B:
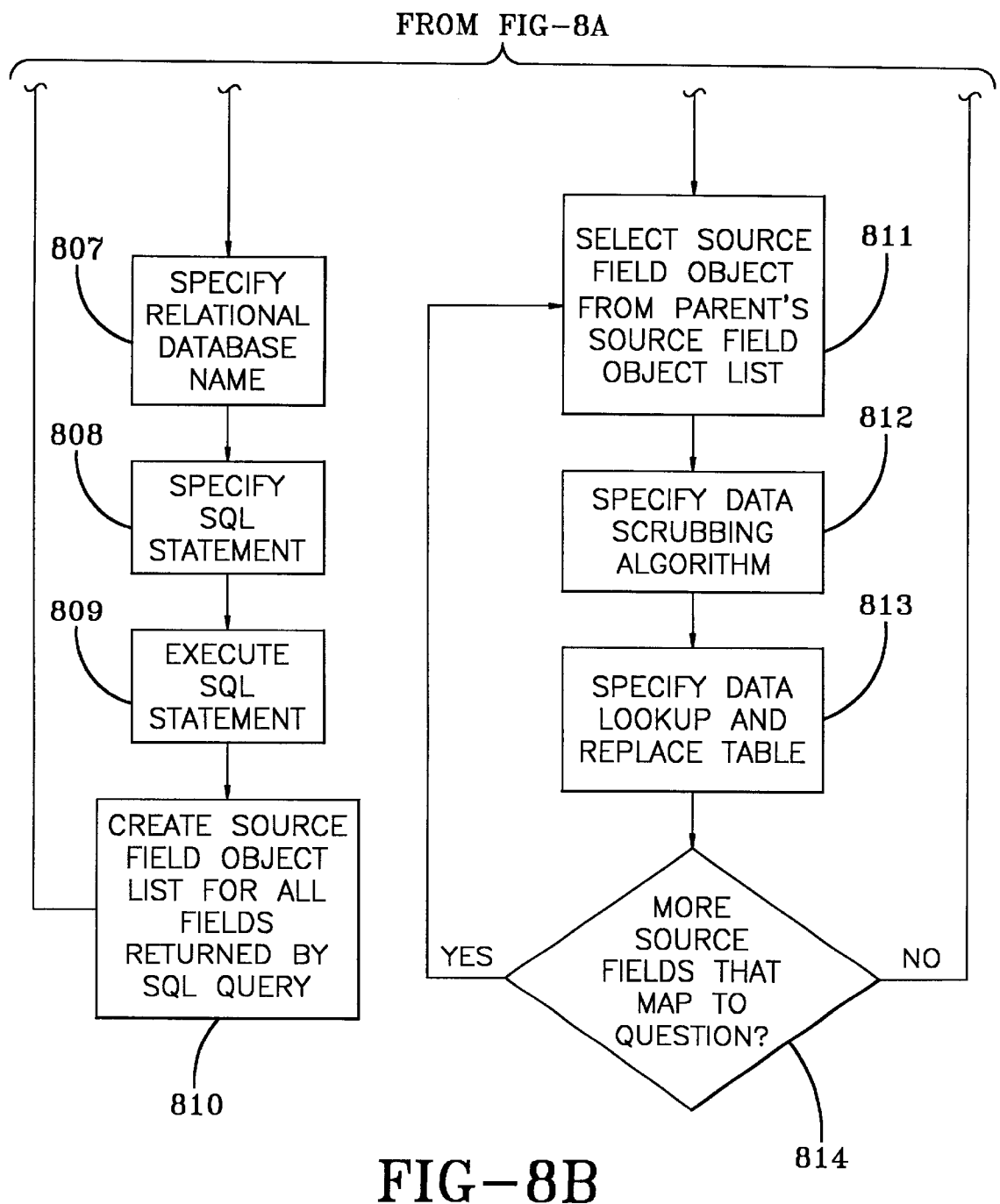

FIGS. 8A and 8B are flowcharts of the relational to hierarchical database mapping process. It shows the details of how the map file is generated after the mapping structure has been created. In accordance with step 801, a hierarchical database schema is created that corresponds to the existing relational database that is to be transformed, as described with reference to FIGS. 5 and 6. In accordance with step 802, a mapping structure that correlates with the hierarchical database schema is then created, such as the one described with reference to FIGS. 7A through 7D.

In accordance with step 803, a database map specification process is begun to complete the mapping structure. This is the process by which the map is filled with fields and statements which will then be used to transfer the actual data from the relational database to the hierarchical database. Since the root node of the mapping structure is created to correlate to a compound map object, as described with reference to FIG. 7B, it can have children. Therefore, we must recursively traverse through all of the children, determine their type of structure (simple or compound), and process them. This process is described in further detail with reference to steps 804–814, below.

In accordance with step 804, the next parent question is retrieved. In the first instance of step 804, this will comprise the Question for the initial parent compound map object (such as "Known Offenders" in FIG. 7B). In accordance with step 805, it is determined whether the parent object contains children. If the parent map object contains children, it is determined what type of child each is, in accordance with step 806. Child map objects are then processed depending on their types, simple or compound. If no child questions remain step 805, and if parent questions remain step 815, then processing is continued in accordance with step 804. If no parent questions remain step 815, processing ends step 816.

For every applicable compound map object, a Relational Database Name is specified, in accordance with step 807, which identifies the relational database from which data is to be transferred to form the hierarchical database. In accordance with step 808, an SQL statement is then generated, which will be used to access the schema of the named relational database. The SQL statement is executed, in accordance with step 809. The execution of the SQL statement for a compound map object results in populating the map structure with the source and field names that are returned in the SQL query. In accordance with step 810, a list of fields is created, which includes all fields returned from the relational database as a result of executing the SQL statement in step 809 and corresponding source field objects are created. For the compound schema object each source field object is mapped to a simple map object that is the child of the compound object being processed. The process then continues at step 805.

If the object type step 806 is a simple object, meaning it does not have children of its own, steps 811–814 are followed. The goal of steps 811–814 is to unite relational database source field objects with every applicable simple map object. In accordance with step 811, the parent's source field list, which was created for the parent object in step 810, is accessed, and the user selects the appropriate field to merge from the relational database to the simple map object.

In accordance with step 812, the user has the ability to specify data manipulation functions that are used as data is transferred from the relational database to the mapping structure and on to the hierarchical database. These may include any functions suitable to correct flaws in data that occur during transfer, such as text inversions, misspellings, missing fields, outdated data such as area codes or zip codes whose boundaries have changed, or other inaccuracies and inconsistencies in the data. Examples of such functions may include data scrubbing routines, data manipulation algorithms, data reengineering or formatting tools, etc.

In accordance with step 813, the user may specify a table of values that can be used to lookup and replace values coming from the relational database to the mapping structure, thus correcting data before they are inserted into the mapping structure or the hierarchical database. In accordance with step 814, it is determined whether additional source fields map to the Question of the simple object being processed. If the simple object maps to more than one field in the Relational Database, then the simple map object process can be repeated, causing at least one additional iteration of steps 811–814. If not, if a parent question remains step 815, then the process is repeated at step 804.

After the map specification process is completed, a finished map file is produced. This map file, the import map, is then imported to the import facility and used to transform the relational database data finally to hierarchical form. The final step in the transformation process of the current invention, then, is the import process, in which data is transformed and transferred to a hierarchical database for storage and indexing.

Figure 9A:
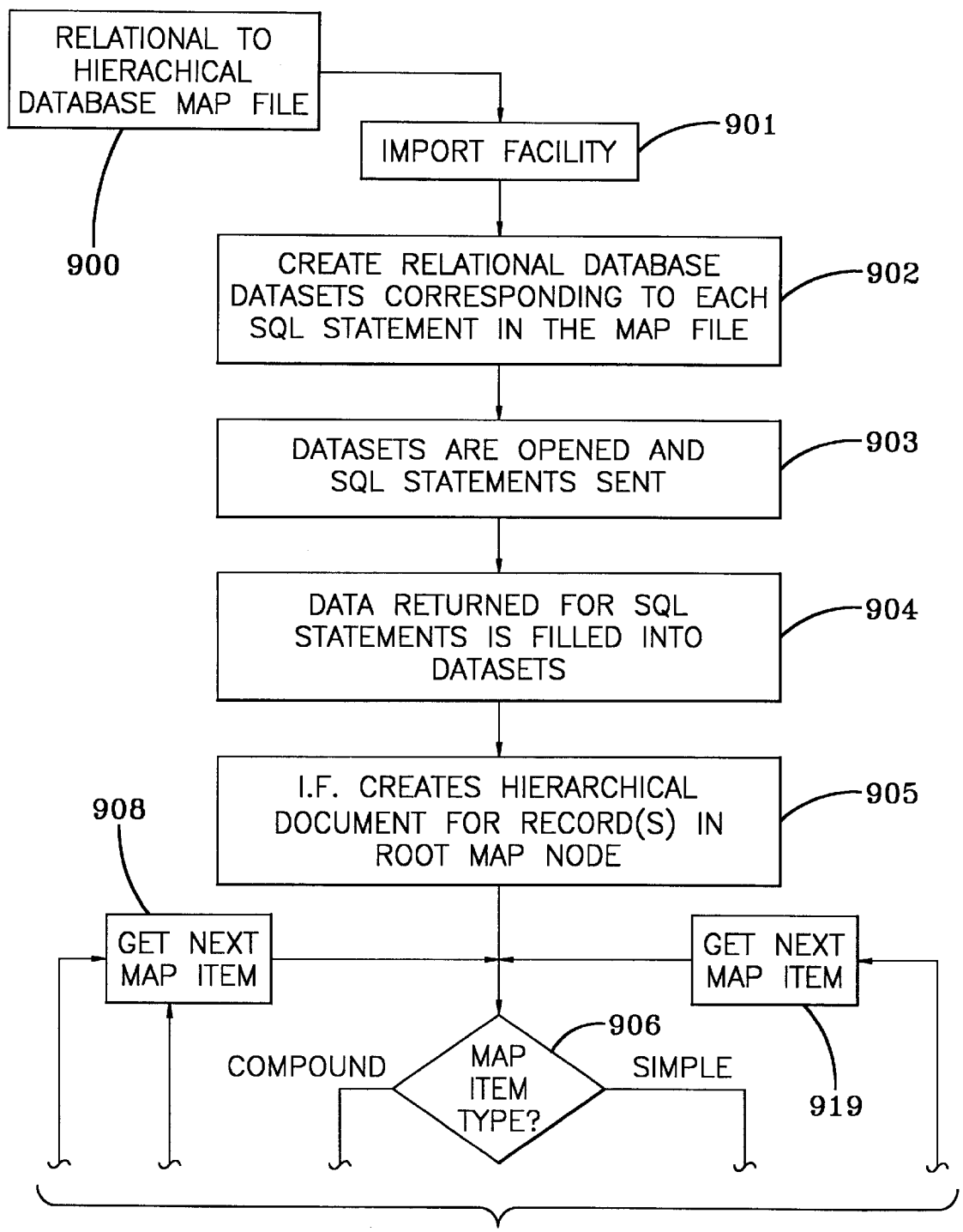
FIGS. 9A and 9B are diagrams illustrating the import facility process of the current invention.
Figure 9B:
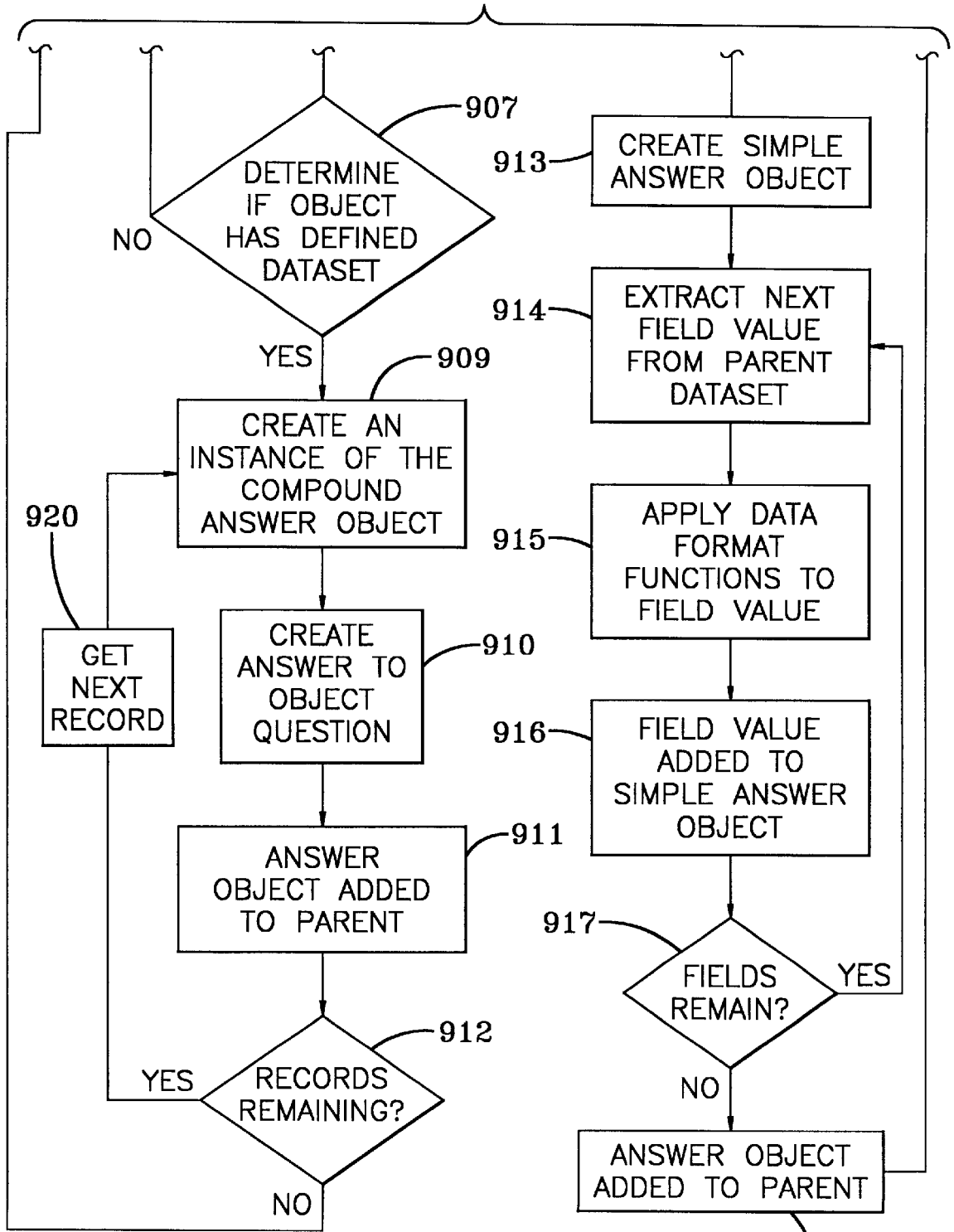

FIGS. 9A and 9B are flowcharts of the import facility process. It shows the detailed parts of how the relational to hierarchical database map file generated according to the process of FIGS. 8A and 8B is used to import data from the relational database to the hierarchical database. Once all applicable fields in the mapping structure have been defined, as described with reference to the process shown in FIGS. 8A and 8B, the map file is complete. In accordance with step 901, then, the map step 900 is imported to the import facility, as described with reference to FIG. 2. The map is used by the import facility to perform the actual conversion and transformation of data values from the relational database to the hierarchical database.

In accordance with step 902, the import facility traverses the map file's structure and creates a dataset for every SQL statement. Recall that SQL statements, as described with reference to FIGS. 7A through 7D, are only created for compound map objects. Thus, only compound map objects will have a dataset created for each of their SQL statements. In accordance with step 903, each dataset is then opened, and the corresponding SQL statement is sent to the relational database. In accordance with step 904, data is retrieved from the database using the SQL statements, yielding a completed dataset structure. The data that is returned for each SQL statement is stored in the corresponding dataset, in the form of one or more records.

In accordance with step 905, the import facility traverses the completed dataset structure and creates a hierarchical document for every record contained in the datasets that corresponds to the root map node. Once the hierarchical document is created for the root node's records, the children of the root node are then traversed. The root node's children are processed, according to whether each child is a compound or simple map object, as determined in accordance with step 906.

Compound map objects are processed in accordance with steps 907–912. For a compound map object, the import facility searches to see if the item currently has a defined dataset, in accordance with step 907. If the dataset is not present, then there is no data to process for the object. The map object is then skipped and the next item is retrieved, in accordance with step 908. If a dataset is located, all records in the dataset for the compound object are traversed. In accordance with step 909, an instance of the compound answer object is created. In accordance with step 910, for each record, an answer is created that corresponds to the compound map object's Question, described with reference to FIG. 7. This results in a compound answer object. Once the answer object is created, the completed answer is added to the hierarchical document created for its parent at step 911.

For example, if the compound object's Question is "Name," each record of the compound object would be traversed and an answer created. The answer for one record might be, for example, the datum "John." For another record, the answer might be "Quincy." For another, the answer might be "Public." A compound answer is then yielded for the compound object "Name," which could comprise any combination of "John," "Quincy," and "Public."

In accordance with step 912, it is determined whether more records exist in the compound object's dataset. If so, the next record is processed step 920, and processing continues at step 909. After answers are created for all records in the compound object's dataset, the next map object is then retrieved in accordance with step 908. If no more records exist step 912, the next map item is retrieved. If there are no more map items, processing ends.

Simple map objects are processed in accordance with steps 913–919. For a simple map object, a simple answer object will be created for the simple map object's question, in accordance with step 913. Each simple map object has a list of relational database source fields that has been mapped to it, as described with reference to FIGS. 6 and 7. For each source field in the list, in accordance with step 914, the relational database field value (the data item(s) in each field) is extracted from the dataset of the parent of the simple map object (since datasets are only created for compound objects in step 902).

In accordance with step 915, the extracted field value is next run through any data formatting functions that are specified by the user. These may include any functions suitable for removing inconsistencies or inaccuracies from data after transfer from one data management system to another. Examples may include data scrubbing routines, data manipulation algorithms, data reengineering or formatting tools, and the use of a lookup and replace table that has been specified by the user. In accordance with step 916, the formatted field value is added to the simple answer object that has been created in step 913. In accordance with step 917, it is determined if additional relational database field source fields have been mapped to the simple object that is being processed. If so, then steps 913–916 are repeated and the values are appended to each other in the simple answer object. Once the simple answer object is completed, the answer object is then added to its parent in the hierarchical document, in accordance with step 918. The next map object is then retrieved for processing, in accordance with step 919.

Figure 10A:
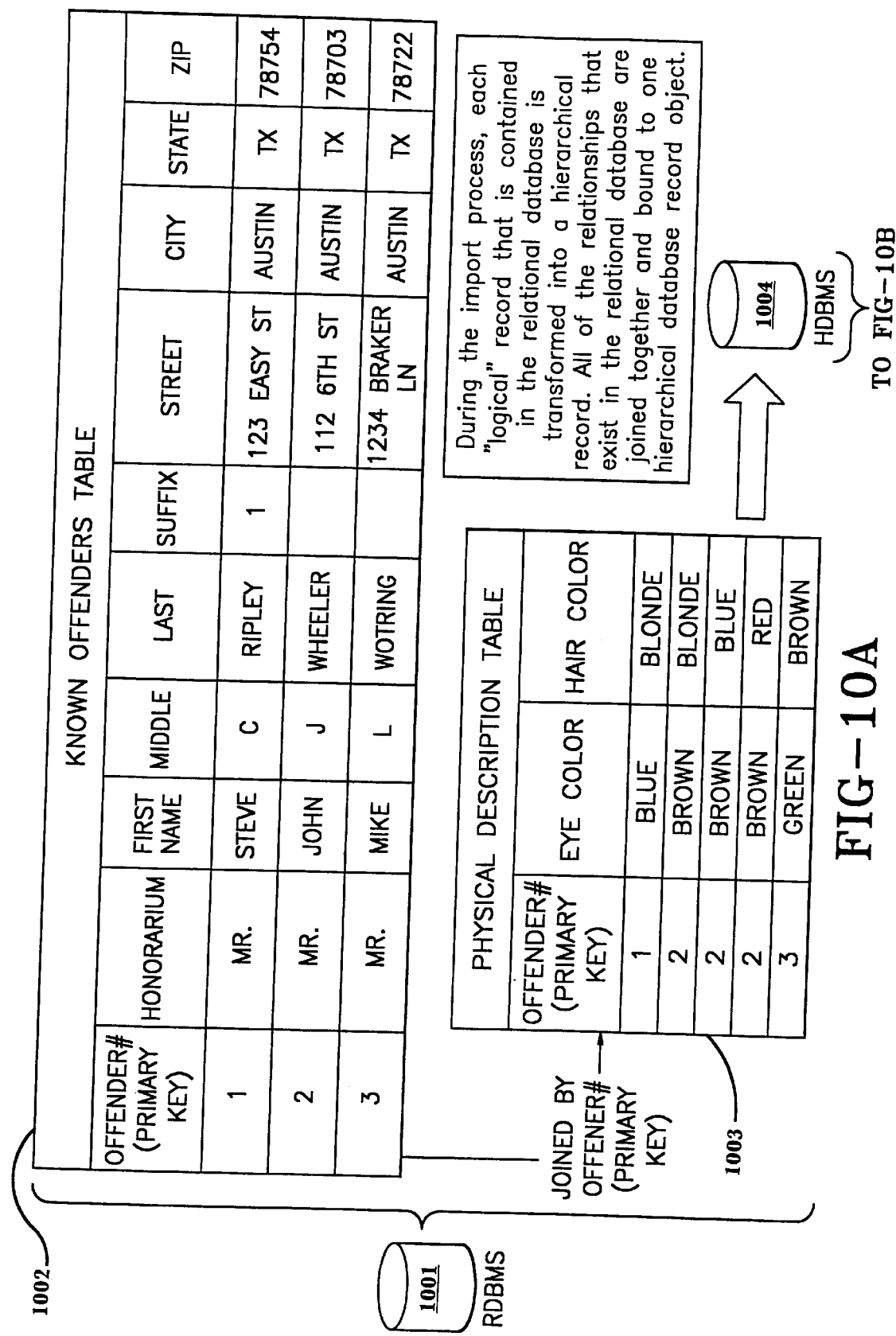
Figure 10C:
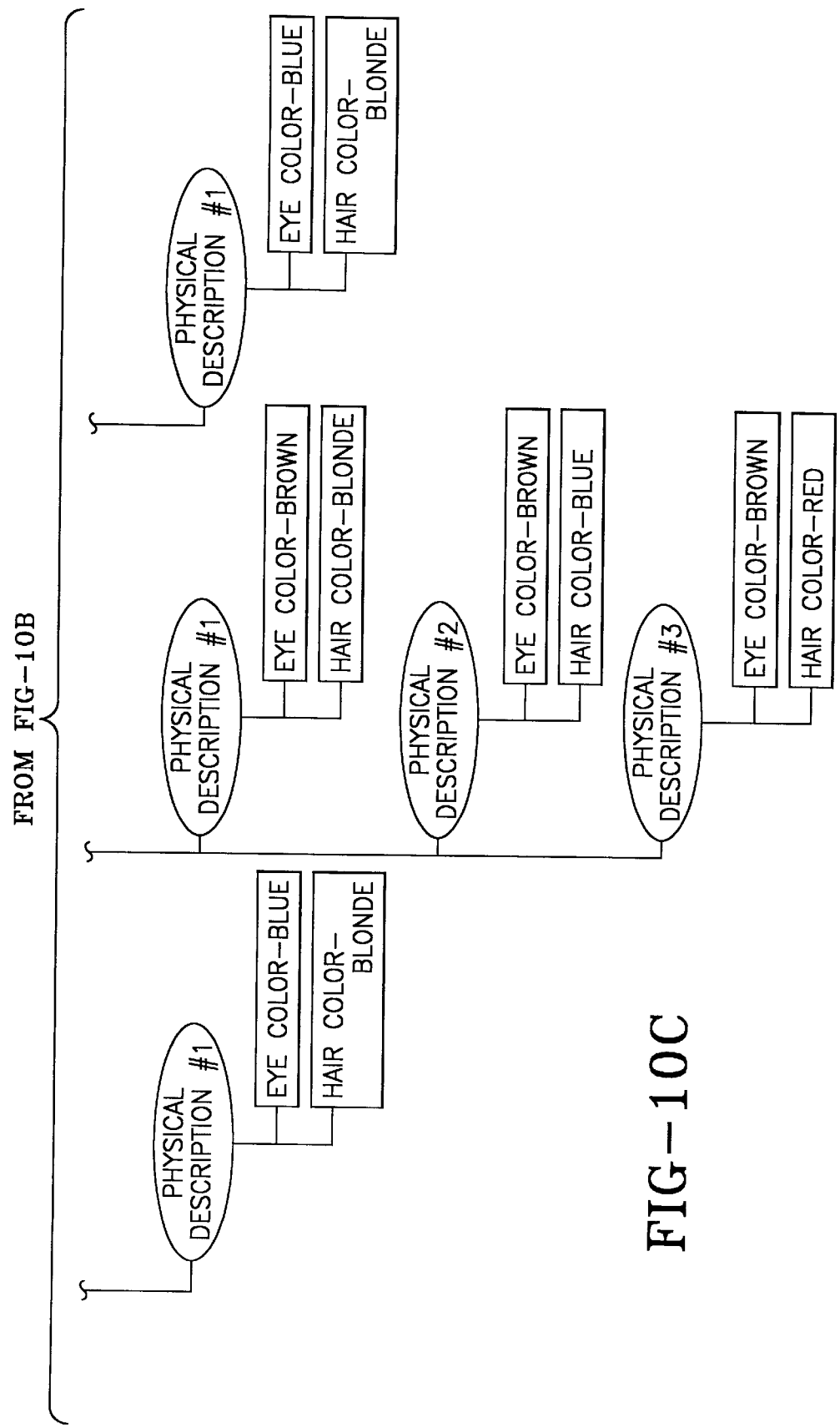

FIGS. 10A and 10B are examples of the creation of a hierarchical database using an exemplary relational database. In this example, the relational database management system RDBMS 1001 comprises a known offender table 1002, which is joined by its primary key to a physical description table 1003. During the import facility process discussed in FIG. 9, each logical record contained in the relational database 1001 is transformed into records in a hierarchical data base management system 1004. Known offender compound objects 1005 contain the data and the relationships that exist in the RDBMS 1001 and are preserved in the hierarchical database that results.

Figure 11:
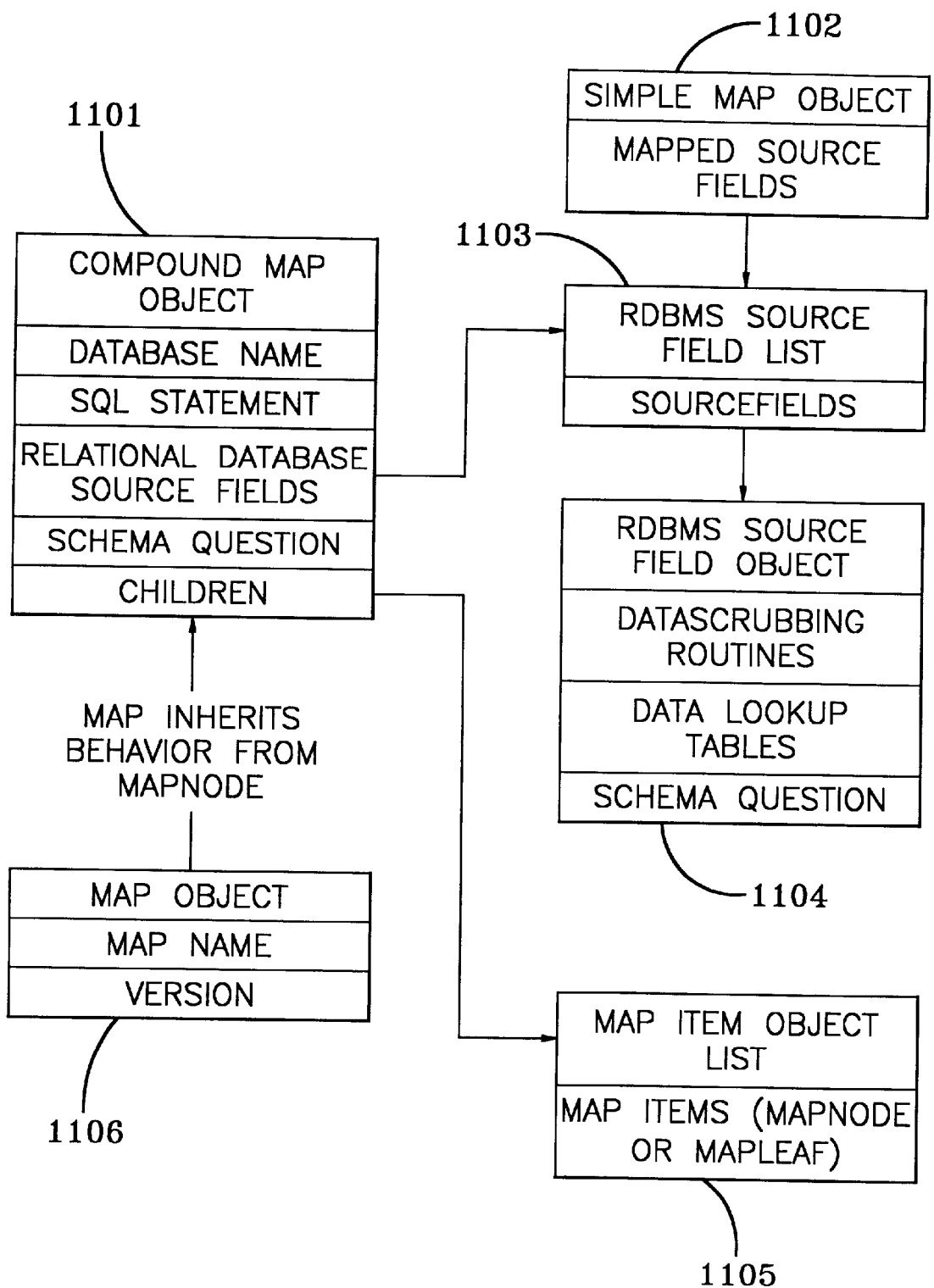
FIG. 11 is a diagram of the map objects structure.

FIG. 11 is a diagram of the map objects structure. It displays the detailed parts of a relational to hierarchical database map file objects. The compound map object 1101 may include the database name, the SQL statement, the relational database source files, the schema question which is a pointer to the schema for the hierarchical database (an example of which is shown in FIG. 7A) and the list of the children of the compound object. The Simple Map Object contains the mapped source fields (also called items) 1102. The RDBMS Source field list contains the source fields that make up the compound map object 1103. The RDBMS Source Field Object contains the data scrubbing routines, data lookup tables and schema question 1114. The Map Item Object List 1105 contains the map items contained within the child object and the MapNode or MapLeaf in the hierarchical database. The Map inherits behavior from the MapNode for the Map Object 1106 which includes the MapName and version.

Once all of the records in the dataset structure have been traversed, the import process is complete. All created hierarchical documents are sent via XML, SGML, or any other markup language, to the Hierarchical Database for storage and indexing, as described with reference to FIG. 1, and the transformation is completed. The present invention transforms a relational database to a hierarchical database prior to performing a search on the transformed database. One type of search that uses a hierarchical database is a similarity search which is disclosed in United States Patent Application entitled "System and Method for Performing Similarity Searching" by David B. Wheeler and Matthew J. Clay, filed on Sep. 22, 1999 and incorporated by reference herein.

Using the foregoing, the invention may be implemented using standard programming or engineering techniques including computer programming software, firmware, hardware or any combination or subset thereof. Any such resulting program, having a computer readable program code means, may be embodied or provided within one or more computer readable or usable media, thereby making a computer program product, i.e., an article of manufacture, according to the invention. The computer readable media may be, for instance a fixed (hard) drive, disk, diskette, optical disk, magnetic tape, semiconductor memory such as read-only memory (ROM), or any transmitting/receiving medium such as the Internet or other communication network or link. The article of manufacture containing the computer programming code may be made and/or used by executing the code directly from one medium, by copying the code from one medium to another, or by transmitting the code over a network.

An apparatus for making, using or selling the invention may be one or more processing systems including, but not limited to, a central processing unit (CPU), memory, storage devices, communication links, communication devices, server, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

Although the present invention has been described in detail with reference to certain preferred embodiments, it should be apparent that modifications and adaptations to those embodiments may occur to persons skilled in the art without departing from the spirit and scope of the present invention.

What is claimed is:

1. A computer-implemented method for transforming data in a relational database to a hierarchical database comprising:
   creating an import map that maps each relational database field to a hierarchical field in the hierarchical database using a relational database schema and a hierarchical database schema, comprising:
     creating a hierarchical database schema, comprising at least one compound and at least one simple object;
     for each compound object, defining an SQL statement, which expresses a 1 to n relationship of the compound object to its parent object and which expresses source fields available for child objects of the compound object;
     relating each simple object to at least one source field name in its parent compound object;
     extracting the source field names from the relational database for all compound objects using the SQL statement; and
     allowing the simple object to access the source field names of its parent compound object to determine the source field names the simple object can map to,
   using the import map to import data from the relational database; and
   transforming the relational data into hierarchical documents, comprising:
     traversing the import map and each time an SQL statement is encountered, executing the SQL statement which results in a compound object dataset; and
     traversing each compound object dataset and finding the relational data for each simple object based on the dataset,
   whereby the relational data is transformed directly into hierarchical documents without using an intermediate step of transforming to a generic data type.

2. The method of claim 1, further comprising creating a hierarchical database schema that corresponds to the relational database schema.

3. The method of claim 1, wherein the creating a hierarchical database schema comprising at least one compound and at least one simple object is based on a relational database key structure where the relational database key structure has at least one primary key and at least one foreign key.

4. The method according to claim 1 further comprising applying a data scrubbing algorithm to the relational data and storing the scrubbed data in the hierarchical document.

5. The method according to claim 1 further comprising storing the hierarchical documents on a storage medium selected from the group consisting of computer memory or disk.

6. The method according to claim 5 wherein the hierarchical document is stored on a storage medium selected from the group consisting of computer memory or disk.

7. The method of claim 1 wherein the creating of a hierarchical document schema comprises:
   step 1: determining a relationship between a first table in the relational database and a second table in the relational database using a primary key;
   step 2: forming a compound object in a hierarchical document that is associated with the first table;

step 3: forming an object selected from the group consisting of a compound object and a simple object that is associated with the second table; and step 4: repeating steps 1 through 3 until all tables within the relational database are associated with an object in the hierarchical document.

8. A computer-readable medium containing instructions for transforming data in a relational database to a hierarchical database comprising:

creating an import map that maps each relational database field to a hierarchical field in the hierarchical database using a relational database schema and a hierarchical database schema, comprising:

creating a hierarchical database schema, comprising at least one compound and at least one simple object;

for each compound object, defining an SQL statement, which expresses a 1 to n relationship of the compound object to its parent object and which expresses source fields available for child objects of the compound object;

relating each simple object to at least one source field name in its parent compound object;

extracting the source field names from the relational database for all compound objects using the SQL statement; and allowing the simple object to access the source field names of its parent compound object to determine the source field names the simple object can map to, using the import map to import data from the relational database; and transforming the relational data into hierarchical documents, comprising traversing the import map and each time an SQL statement is encountered, executing the SQL statement which results in a compound object dataset; and traversing each dataset and finding the relational data for each simple object based on the compound object dataset, whereby the relational data is transformed directly into hierarchical documents without using an intermediate step of transforming to a generic data type.

9. A computer-readable medium containing a collection of hierarchical objects in an import map, the import map comprising:

at least one compound object comprising:

an indicator of a relational database and a field name of relational data associated with the compound object;

a structured query language (SQL) statement;

a source field name extracted from the relational database using the SQL statement; and at least one simple object comprising:

a field name of relational data associated with the simple object;

the relational data extracted from the relational database and stored in the simple object.

* * * * *